(12) United States Patent
Epars

(10) Patent No.: US 11,470,996 B2
(45) Date of Patent: Oct. 18, 2022

(54) TELESCOPIC CUP TRAY FOR A BEVERAGE MACHINE

(71) Applicant: SOCIETE DES PRODUITS NESTLE S.A., Vevey (CH)

(72) Inventor: Yann Epars, La Conversion (CH)

(73) Assignee: Societe des Produits Nestle S.A., Vevey (CH)

( * ) Notice: Subject to any disclaimer, the term of this patent is extended or adjusted under 35 U.S.C. 154(b) by 330 days.

(21) Appl. No.: 16/769,389

(22) PCT Filed: Dec. 4, 2018

(86) PCT No.: PCT/EP2018/083395
§ 371 (c)(1),
(2) Date: Jun. 3, 2020

(87) PCT Pub. No.: WO2019/110535
PCT Pub. Date: Jun. 13, 2019

(65) Prior Publication Data
US 2021/0186256 A1    Jun. 24, 2021

(30) Foreign Application Priority Data

Dec. 5, 2017 (EP) .................................. 17205548

(51) Int. Cl.
*A47J 31/44* (2006.01)
*A47J 31/36* (2006.01)

(52) U.S. Cl.
CPC ....... *A47J 31/4482* (2013.01); *A47J 31/3676* (2013.01)

(58) Field of Classification Search
CPC .......................... A47J 31/3676; A47J 31/4482
(Continued)

(56) References Cited

U.S. PATENT DOCUMENTS 9,314,131 B2 * 4/2016 Luippold ............ A47J 31/4407
2005/0224674 A1  10/2005 Park
(Continued)

FOREIGN PATENT DOCUMENTS

CN       201591260 U     9/2010
CN       203138089       8/2013
(Continued)

*Primary Examiner* — Jason K Niesz
(74) *Attorney, Agent, or Firm* — K&L Gates LLP

(57) ABSTRACT

The present invention concerns a food and beverage preparation machine (1) comprising a machine body (2), a fluid system for preparing and dispensing a beverage, a beverage dispensing opening, and a cup tray (6) attached to the machine body in at least two possible height positions. According to the invention, the machine comprises a pit (7) with a cylindrical opening located below a dispensing opening, said cylindrical opening comprising at least one guiding pin (8), and the cup tray comprises a horizontal plate (10) and a vertical cylinder (11), the cylinder having a vertical cam groove (12) adapted to receive said guiding pin in a slidable manner for displacing the cup tray in height, and superimposed horizontal groove branches (13) extending from the vertical groove, advantageously through lower and upper curved camways defining a cusp-shaped cam path, for fixing the cup tray at predetermined height positions.

7 Claims, 14 Drawing Sheets

(58) Field of Classification Search
USPC ........................................................ 141/266
See application file for complete search history.

(56) References Cited

U.S. PATENT DOCUMENTS

| | | | | |
|---|---|---|---|---|
| 2006/0065126 A1* | 3/2006 | Turi | .................... | A47J 31/4482 99/279 |
| 2009/0078790 A1 | 3/2009 | Camilleri et al. | | |
| 2012/0187269 A1* | 7/2012 | Startz | .................. | A47J 31/4482 248/346.06 |

FOREIGN PATENT DOCUMENTS

| | | | | |
|---|---|---|---|---|
| CN | 203557990 U | 4/2014 | | |
| CN | 104210406 A | 12/2014 | | |
| CN | 206466900 U | 9/2017 | | |
| CN | 111688560 A | 9/2020 | | |
| DE | 4226151 A1 * | 2/1994 | .......... | A47J 31/4482 |
| DE | 102011004029 | 8/2012 | | |
| EP | 0585607 | 3/1994 | | |
| EP | 3048590 | 7/2016 | | |
| EP | 3222175 | 9/2017 | | |

* cited by examiner

TELESCOPIC CUP TRAY FOR A BEVERAGE MACHINE

CROSS REFERENCE TO RELATED APPLICATIONS

The present application is a National Stage of International Application No. PCT/EP2018/083395, filed on Dec. 4, 2018, which claims priority to European Patent Application No. 17205548.5, filed on Dec. 5, 2017, the entire contents of which are being incorporated herein by reference.

FIELD OF THE INVENTION

The present invention concerns a cup tray for a beverage preparation machine.

BACKGROUND OF THE INVENTION

Cup trays for beverage preparation machines are well known. They allow to support a cup or other type of similar container when the machine is in use, to ensure that the cup upper opening is positioned at the right distance from the beverage dispensing opening of the machine, so as to avoid spillage of product outside, and provide easy handing for the user.

The prior art cup trays comprise a certain number of defects, as follows.

Many manual simple cup trays require disconnecting the tray from the rest of the machine, and then reconnecting for changing the tray from one height position to another. This is not user friendly, as the user can sometimes not reconnect it properly so that the cup tray falls when in use. Moreover a cup tray that is a separate block from the rest of the machine is not aesthetic because it protrudes from the surface of said machine, at least in some of its positions (see prior art tray illustrated in FIGS. 1B and 1C).

Some other types of cup trays are complex and comprise several parts which need to be assembled which increases the cost of the machine.

Motorized cup trays are very expensive and complex to build, despite their high level of convenience.

Helical systems for adjusting the height of the cup tray, have the first disadvantage that they allow only two discrete height positions, which correspond to the two extremities of the screw thread of the tray. Secondly, such helical systems impel a rotation to the cup tray, which can cause aesthetical issues: e.g. when the tray is decorated or comprises a logo or a picture, they do not allow to keep the position of said logo or picture at the same predetermined alignment position relative to the rest of the machine, whatever the height position of the tray (see prior art illustrations, in FIGS. 1A, 1B and 1C).

The present invention purpose is to solve the drawbacks of the known cup tray systems, and provide a cup tray that is manual, easy to use and clean, inexpensive and simple to manufacture, easy to handle, and provides good aesthetics for the whole machine.

SUMMARY OF THE INVENTION

The purpose of the invention described above is met with a machine comprising a machine body, a fluid system adapted to mix a fluid with an ingredient for the preparation of a food or beverage product and a dispensing opening for delivering the food or beverage into a cup or other receptacle, and further comprising a cup tray that can be attached to the machine body in at least two alternative height positions relative to said dispensing opening, characterized in that:

i. said machine body comprises a pit with a cylindrical opening located below the dispensing opening, said cylindrical opening comprising at least one guiding pin extending inwardly from the peripheral edge of the pit's opening, and ii. said cup tray comprises a horizontal plate and a cylinder extending vertically downwardly therefrom, the outer surface of said cylinder having a vertical cam groove adapted to receive said guiding pin in a slidable manner for displacing the cup tray in height, and at least two discrete superimposed horizontal groove branches extending from the vertical groove, for fixing the cup tray at predetermined height positions.

In the most preferred embodiment of the invention, each horizontal groove branch extends horizontally from the vertical cam groove through lower and upper curved camways defining a cusp-shaped cam path.

Advantageously, the pit comprises at least one vertical ramp protruding inwardly towards the middle of said pit, adapted to cooperate with at least one corresponding latching pin mounted on a flexible strip of the cylinder, so as to form a latch mechanism for releasably locking the tray in each of its height positions.

More preferably, the pit comprises three equidistant ramps and the cylinder comprises three corresponding equidistant flexible strips.

The cup tray cylinder is preferably hollow and has one lower end closed, and one upper end opened through the plate, said opening being covered by a removable grid.

The beverage preparation machine is preferably adapted for use with at least one ingredient container such as a capsule, pod, pad, sachet, or the like. Also preferably, the ingredient is comprised with the list of: roast and ground coffee, powdered or liquid soluble coffee, powdered or liquid soluble dairy ingredient, soluble tea, leaf tea, soup, syrup, powder, liquid or gel nutritional compositions.

The main advantages of the cup tray according to the invention are as follows.

It provides a clean solution by avoiding movable parts in contact with any product, and is made of rounded, cylindrical parts that are easy to clean; furthermore, the cup tray plate and cylinder parts can be fully disconnected from the rest of the machine (they are not fixed to it) and can be washed manually or in a dishwasher for high cleanliness and hygiene.

The vertical track cam and horizontal positions at each height setting reach the same rotational angle of the cup plate and cylinder, relative to the pit and to the rest of the machine: this allows any inscription printed onto the cup tray, such as a logo, to be always aligned with the rest of the machine body, for improved aesthetics, and correct visualisation by the user of information printed on the cup tray.

When the tray is set in its lowermost configuration, it is fully integrated into the machine body, and therefore well integrated in terms of design, and does not protrude such that the machine is easier to clean, and is less bulky. When in top position it is not creating a discontinuity in the machine front.

For each different height setting of the cup tray, the projection extending inwardly towards the middle of said branch of the cam path, that forms a latch mechanism, provides a sound effect like a "click", when the horizontal rotation of the cup tray is complete, which gives a tactile and sound confirmation to the user that the tray is well in place and latched in its position.

Another advantage of the cup tray according to the invention is that it allows to define a large number of stable intermediate setting positions, along the setting path, by design of a corresponding number of horizontal cam groove branches.

BRIEF DESCRIPTION OF THE DRAWINGS

Additional features and advantages of the present invention are described in, and will be apparent from, the description of the presently preferred embodiments which are set out below with reference to the drawings in which:

FIGS. 8A to 8D are perspective side views of the cup tray in different configurations illustrating how to unlock, set to different height level, and lock again said cup tray;

DETAILED DESCRIPTION OF THE INVENTION

Figure 1A:
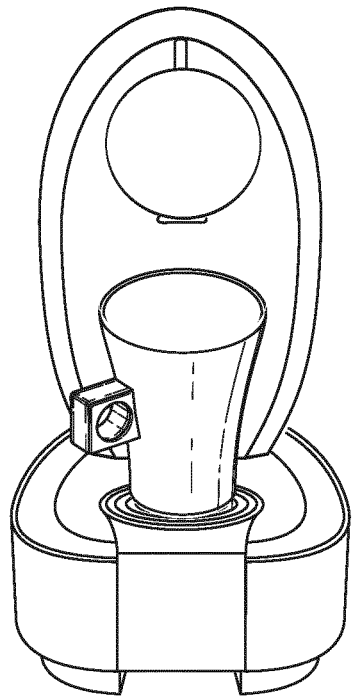
FIGS. 1A to 1C are enlarged front views of the bottom part of a beverage machine of the prior art, showing a manual cup tray respectively in its lowermost, intermediate, and uppermost positions.
Figure 1B:
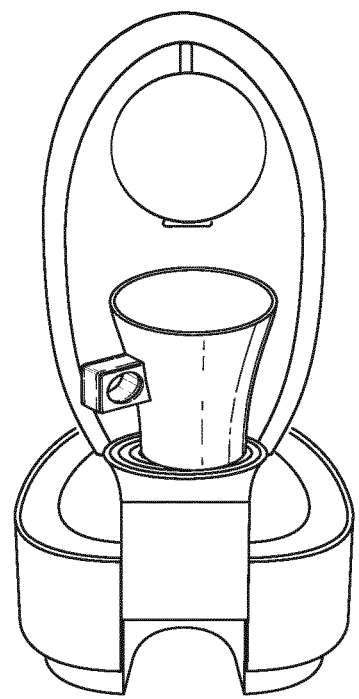
Figure 1C:
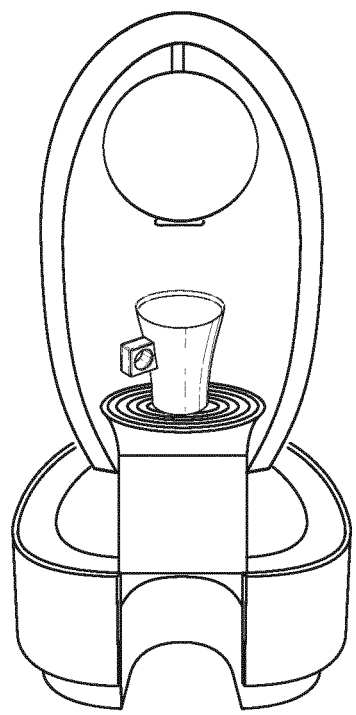
Figure 2:
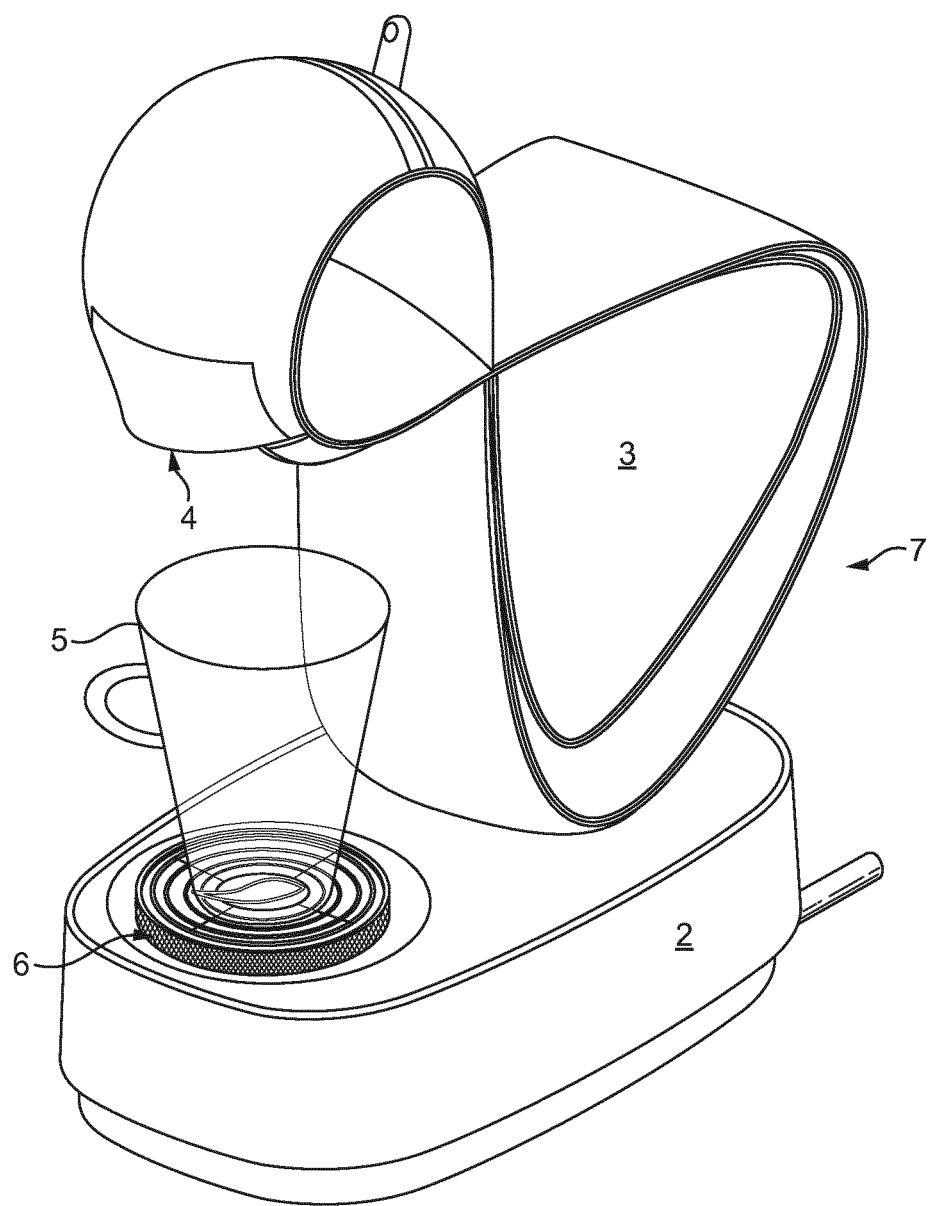
FIG. 2 is a general perspective view of a beverage preparation machine according to the invention.

As illustrated in FIG. 2, the invention concerns a food and beverage preparation machine 1 comprising a machine body 2, a fluid system (not shown) adapted to mix a fluid with an ingredient for the preparation of a food or beverage product, a fluid reservoir 3, a dispensing opening 4 for delivering the food or beverage into a cup 5.

The machine further comprises a cup tray 6 that can be attached to the machine body 2 in several alternative height positions relative to said dispensing opening 4. In the embodiment described as example in the rest of the present description, it will be considered that the fluid for beverage preparation is water, and that the ingredient for preparing a food or a beverage into the machine by mixing with water, is chosen within the list of: roast and ground coffee, powdered or liquid soluble coffee, powdered or liquid soluble dairy ingredient, soluble tea, leaf tea, soup, syrup, powder, liquid or gel nutritional compositions. For instance, a coffee beverage is produced by passing through hot water through a bed of roast and ground coffee, under pressure.

Figure 3:
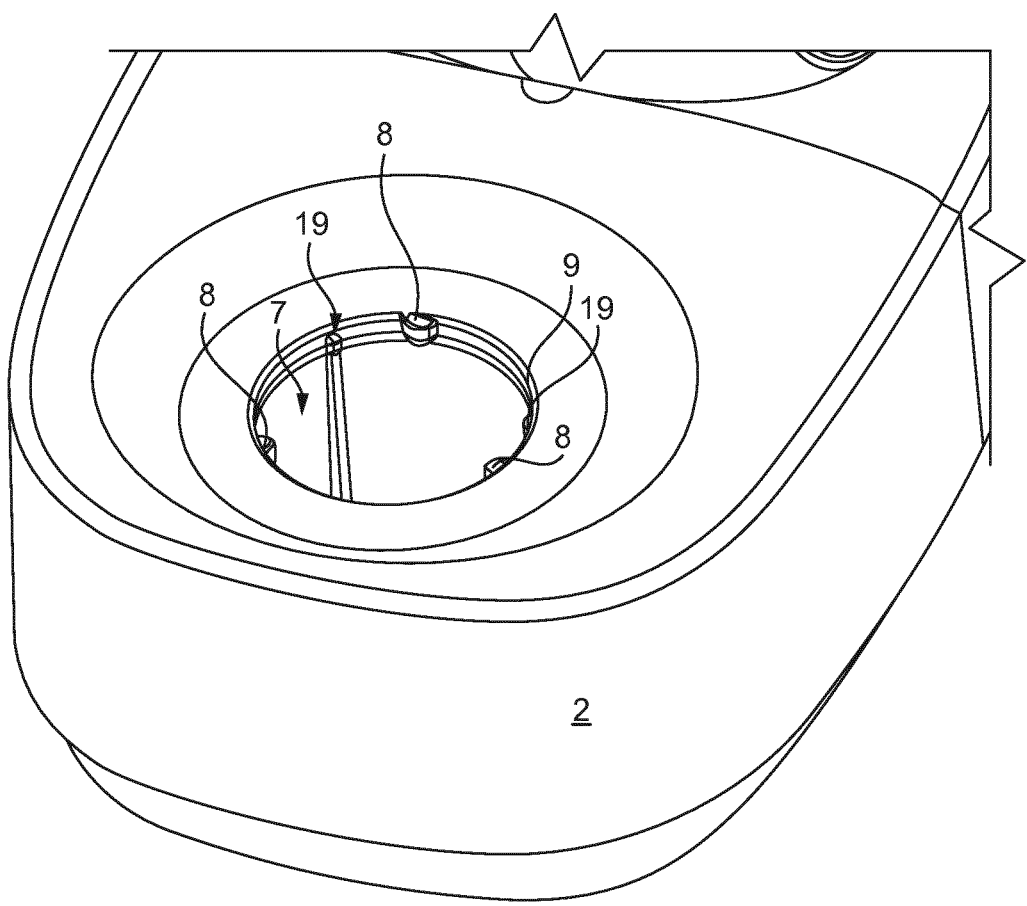
FIG. 3 is an enlarged perspective top view of the lower part of the machine, showing the pit for insertion of the cup tray cylinder.
Figure 11:
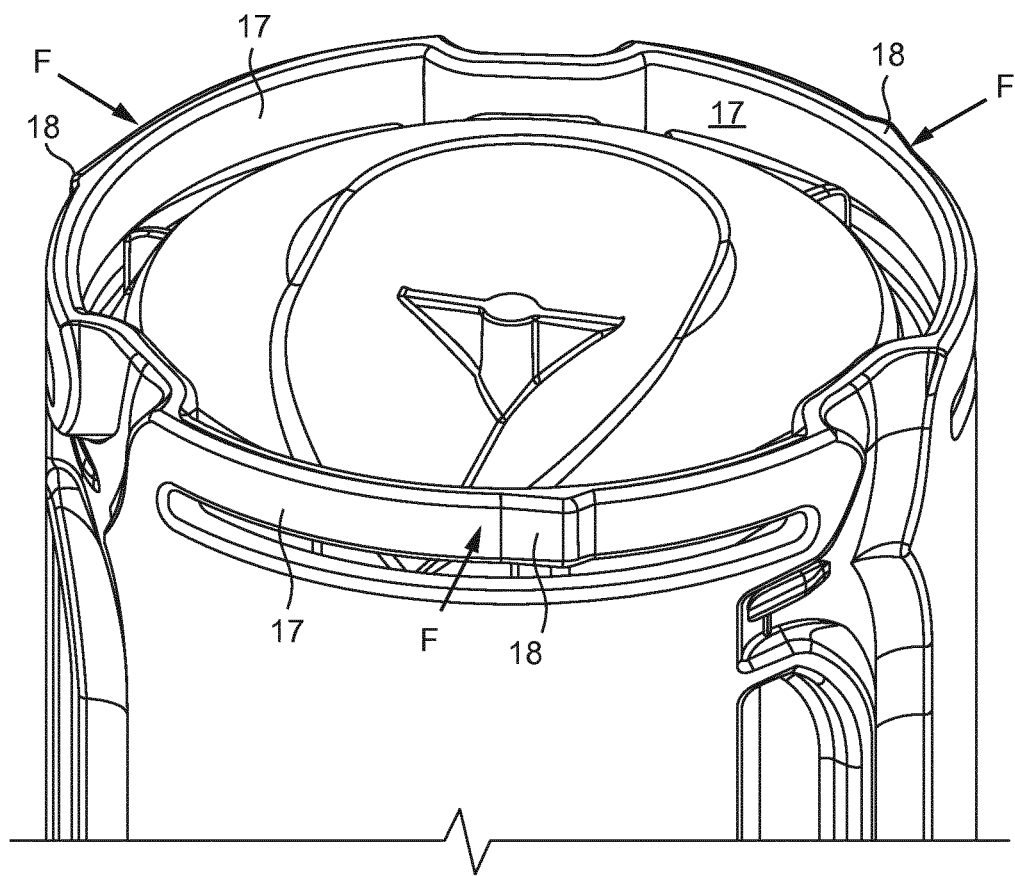
Figure 12:
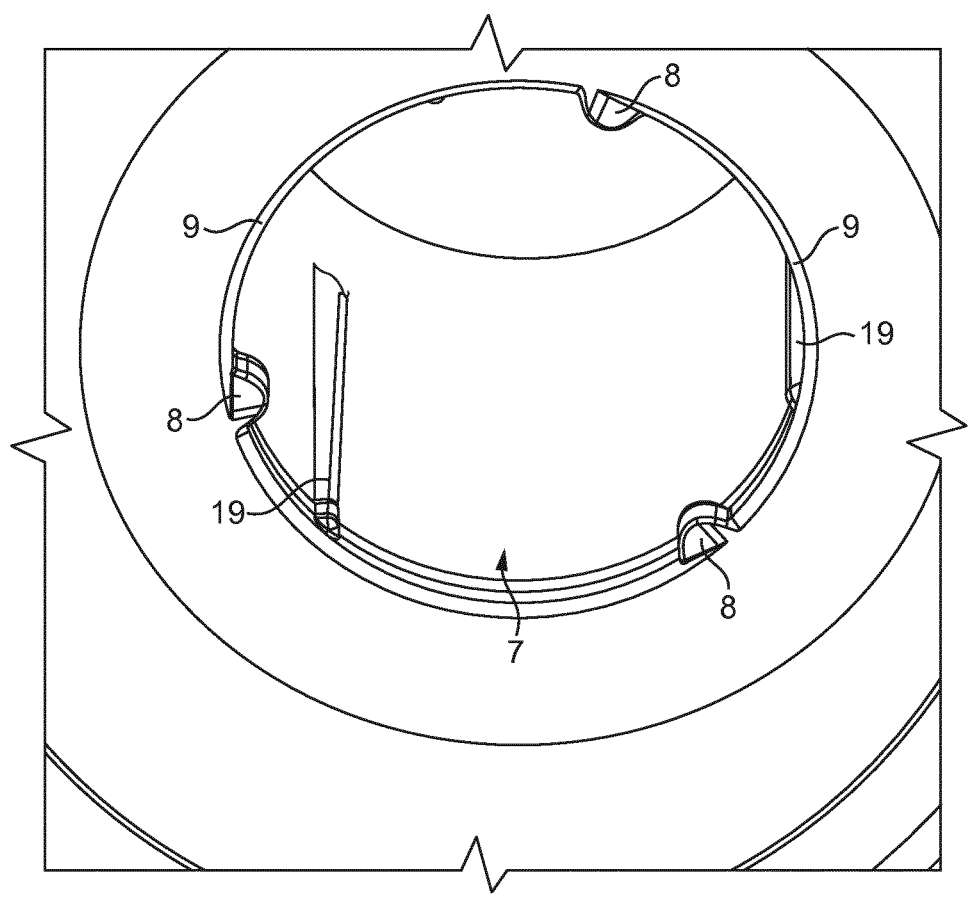
FIG. 12 is an enlarged view of the machine pit wherein the tray according to the invention is functionally inserted.

As illustrated in FIGS. 3 and 11, the machine body 2 comprises a pit 7 with a cylindrical opening located in vertical alignment below the dispensing opening 4, said cylindrical opening comprising three guiding pins 8 extending inwardly from its peripheral edge 9. The guiding pins 8 are equidistant from each other along the peripheral edge 9 as shown in FIG. 3, which equilibrates the mechanical forces when the cup tray is functionally in place in the pit.

As depicted in FIG. 3 and FIG. 11, the pit 7 further comprises three blocking ramps 19 that are protrude inwardly towards the centre of the pit 7, and extend vertically from the edge 9 towards the bottom of said pit.

Figure 4:
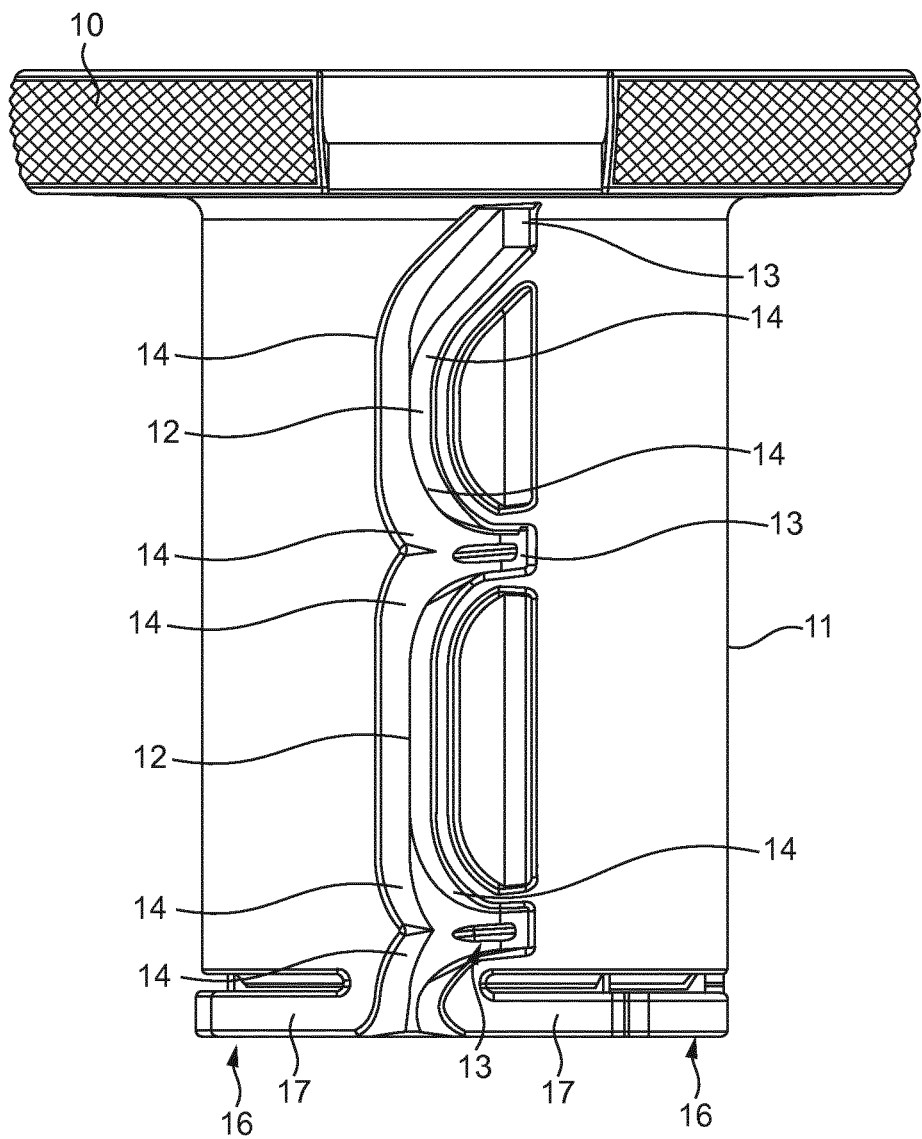
FIG. 4 is a front view of the cup tray according to the invention.
Figure 5:
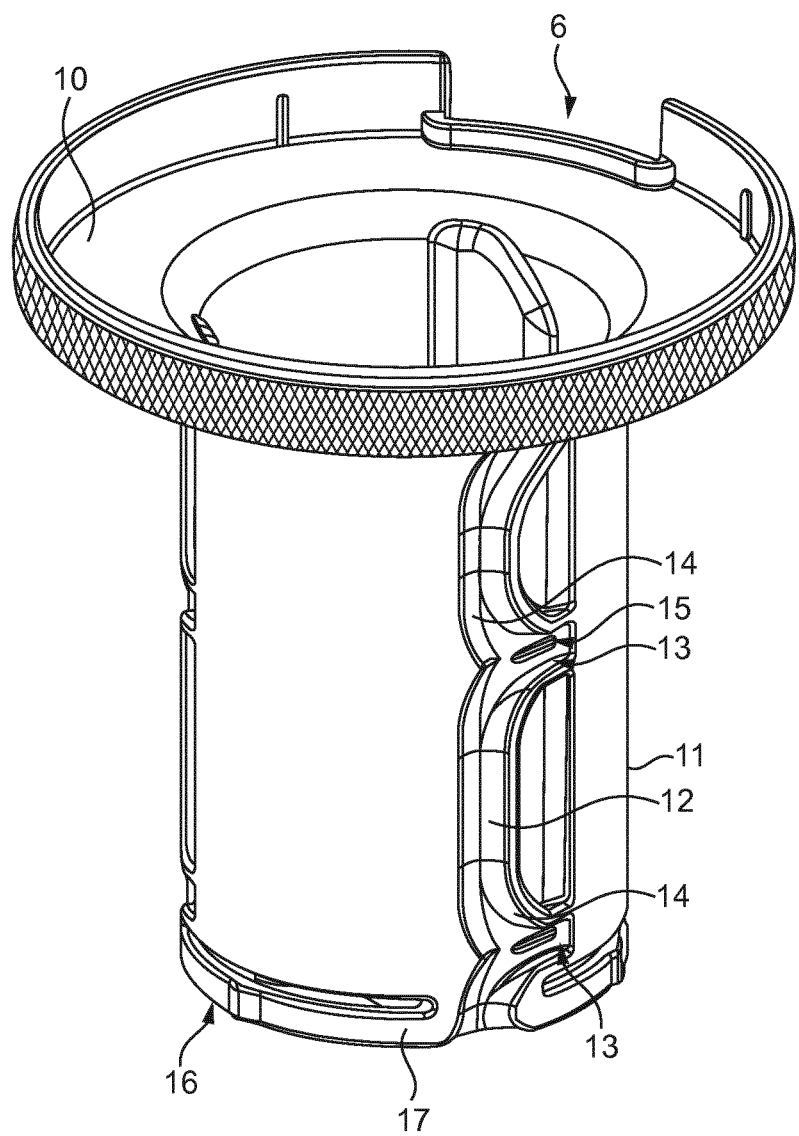
FIG. 5 is a perspective top view similar to FIG. 4.

The cup tray according to the invention, as illustrated in FIGS. 4 and 5, comprises a horizontal grid plate 10, and a cylinder 11 extending vertically downwardly therefrom. The outer surface of the cylinder 11 features three vertical cam grooves 12 adapted to receive the corresponding guiding pins 8 of the machine body, in a slidable manner for displacing the cup tray in height. The three vertical cam grooves 12 are located equidistant from each other around the periphery of the cylinder 11, with the same distance as that between the guiding pins 8. The cup tray cylinder 11 further comprises three discrete superimposed horizontal groove branches 13 extending from each vertical groove 12, for fixing the cup tray at predetermined height positions. The length of each horizontal groove branch 13 is reduced but is sufficient to allow proper positioning of the guiding pins 8 therein in a stable position of the cup tray, for each height configuration of said cup tray. Each horizontal groove branch 13 extends horizontally from the vertical cam groove 12 through lower and upper curved camways 14 defining a cusp-shaped cam path.

As shown in FIG. 5, each horizontal branch 13 comprises a stabilizing bump 15 located longitudinally along said branch 13. The outer diameter measured at the tip of the three bumps 15 which are disposed at equal distance from each other around the cylinder 11, is slightly greater than the diameter measured at the tip of the three guiding pins 8 of the pit 7 illustrated in FIG. 3. This ensures that the cup tray is stabilized within the machine body pit when said cup tray 6 is functionally in place and locked in one height position therein, and does said tray 6 not wobble even if the cup that rests on the cup tray is heavy. Of course, the functional play between the cup tray 6 and the pit 7, is such that it allows rotation of said cylinder in said pit, by an easy manual rotation applied by the user.

Figure 6:
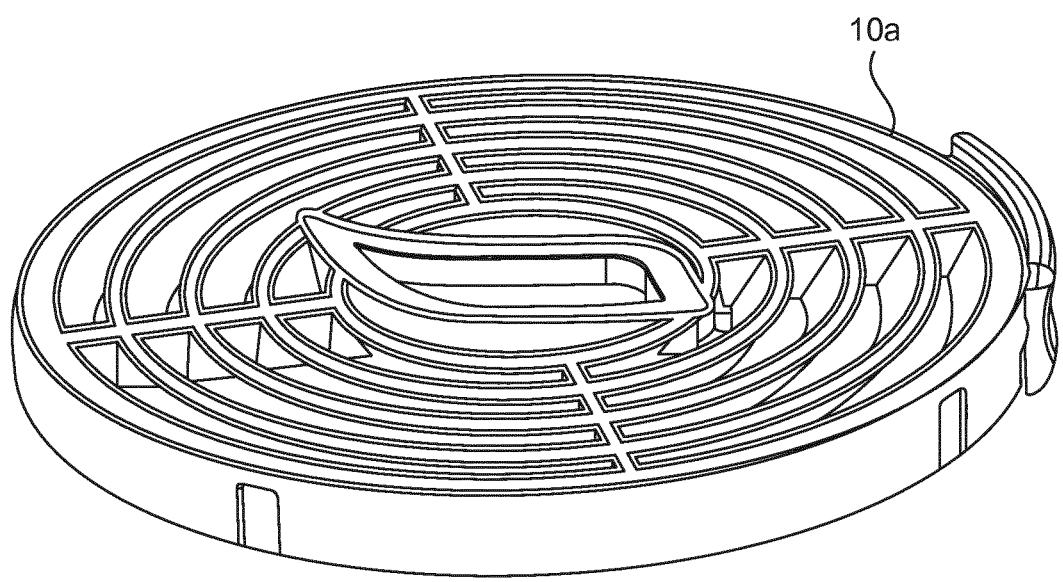
FIG. 6 is a perspective top view of the cup tray plate.
Figure 7:
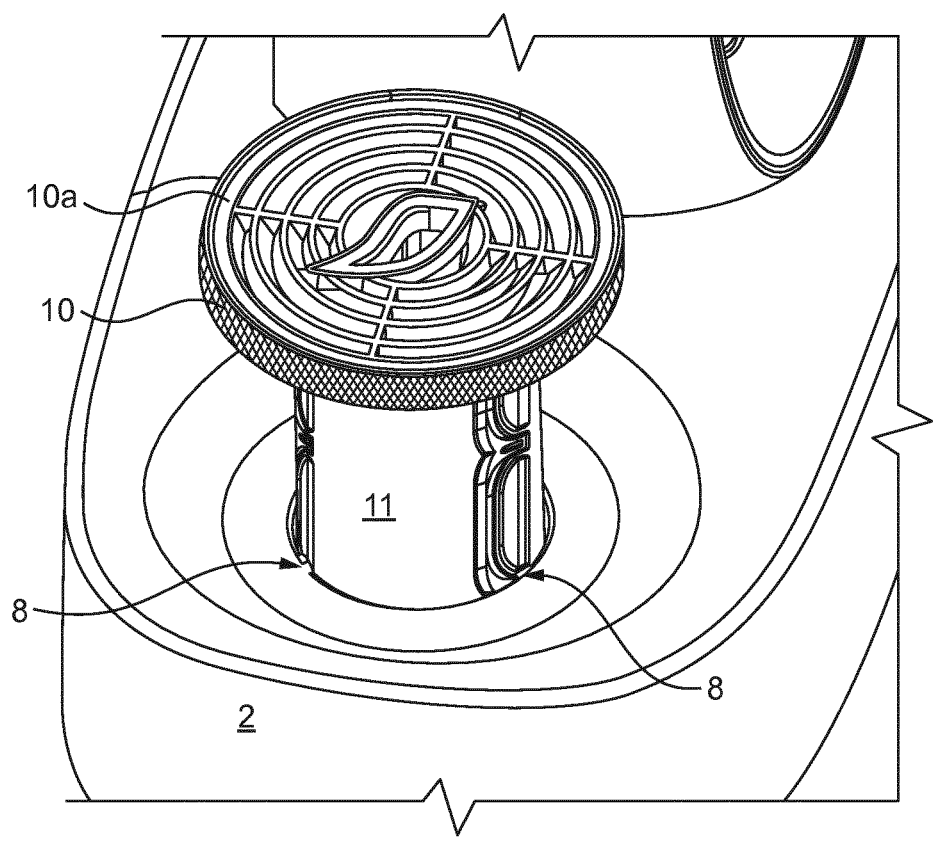
FIG. 7 is an enlarged front view of the cup tray according to the invention in its uppermost position.

As shown in FIG. 5, the cup tray cylinder is hollow and has one lower end closed, and one upper end opened through the plate 10, said opening being covered by a removable grid 10a that is illustrated in FIGS. 6 and 7 onto which a cup or other beverage or food container can be positioned.

Figure 10:
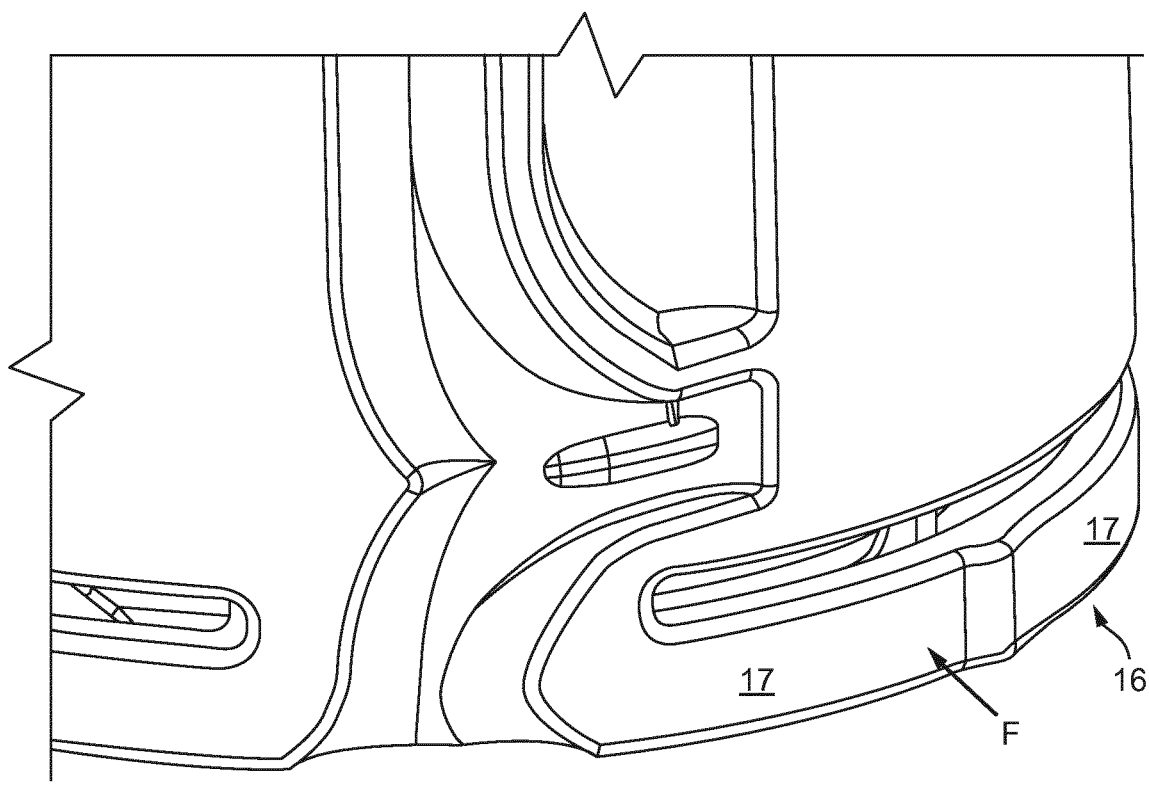
FIGS. 10 and 11 are enlarged views of the bottom part of the cup tray (in FIG. 11, the tray is turned upside-down)

The lower end of the cylinder comprises at least one, but preferably three flexible latching mechanisms 16 as illustrated in FIGS. 4 and 5. Each of the flexible latching mechanisms 16 is integrally moulded with the rest of the cylinder 11 and comprises a flexible strip 17, both distal ends of which are attached to the rest of the cylinder 11, such that the strip is free to flex between its distal ends when an external force F is exerted radially towards the inside of the cylinder as illustrated with arrows in FIGS. 10 and 11. Each strip 17 comprises a outwardly protruding pin 18. In the embodiment illustrated in the drawing, the cylinder 11 comprises three latching mechanisms 16, disposed around the periphery of the bottom portion of the cup tray, as illustrated in FIG. 11. The three latching mechanisms 16 are distributed evenly along the periphery of the cylinder, such that the three corresponding flexible strips 17 outcrop the surface of the cylinder, as depicted in FIG. 5, and such that the three corresponding protruding pins 18 protrude outwardly from the surface of the rest of the cylinder as shown in FIGS. 10 and 11. The three pins 18 are equidistant around the periphery of the cylinder and able to interact with the three corresponding blocking ramps 19 of the pit 7. More precisely, the relative diameters of the pit's edge 9, the thickness of the ramps 19, the diameter of the cylinder 11 and the thickness of the pins 18 are such that in use, the cylinder is free to rotate within the pin, but in one rotational position, the pins 18 meet the ramps 19 so that the latter exert an external force F onto the pins 18 that forces the respective strips 17 inwardly, so as to create a point of resistance to rotation of the cup tray cylinder inside the pit. The respective angular position of the ramps 19 and the guiding pins 8 of the pit 7, relative to the symmetry axis of the pit, are such that when the guiding pins 8 are driven inside the horizontal groove branches 13, the innermost position of said pins 8 inside said branches 13 is reached only after the rotation resistance point is overcome, thus creating a releasable latch mechanism. Therefore, each position of the cup tray at a certain height inside the pit is stabilized by said releasable latch mechanism, when the full rotation of said tray in a one given height position is achieved.

The use of the cup tray in a machine according to the invention is illustrated in FIGS. 8A to 8D and comprises the following steps, in order.

Figure 8A:
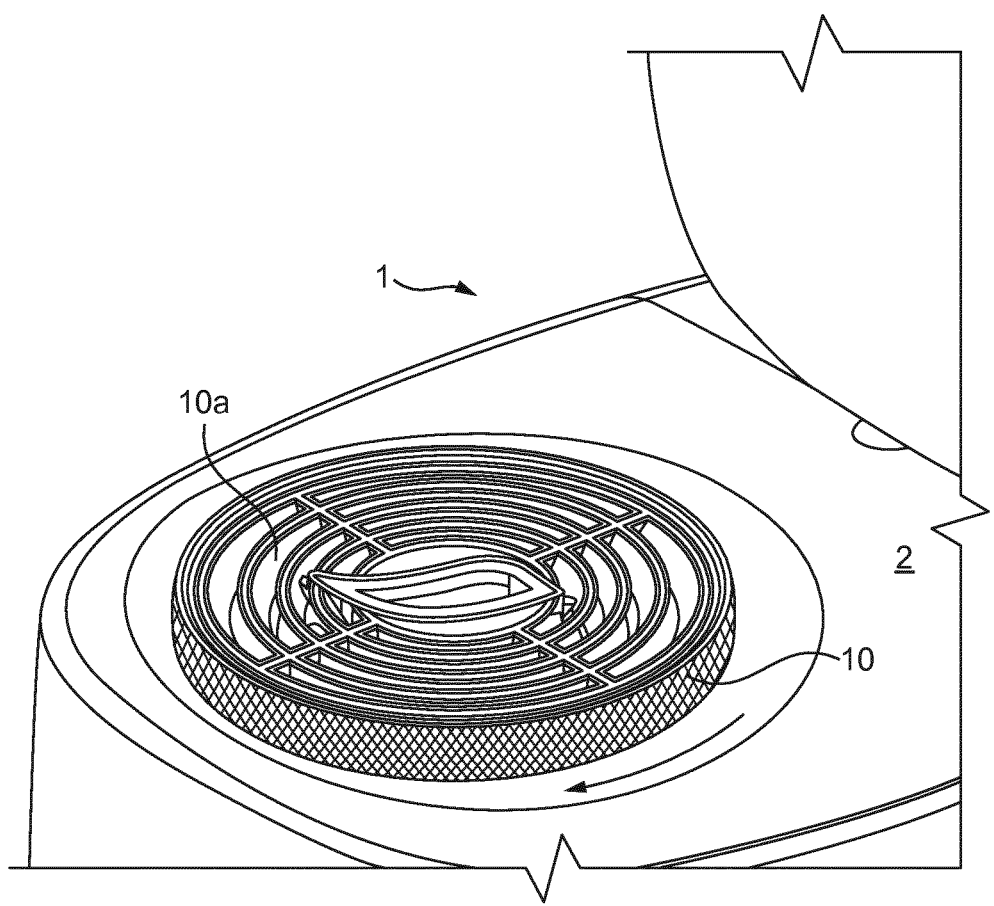
Figure 8B:
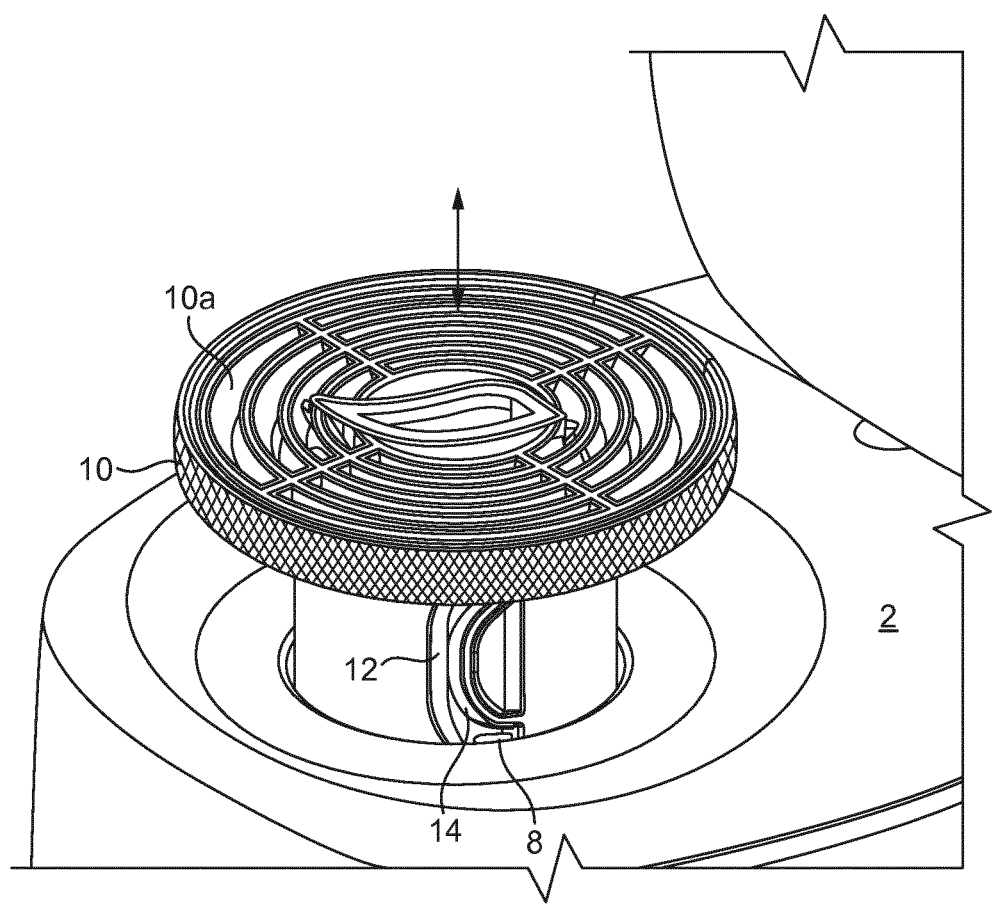
Figure 8C:
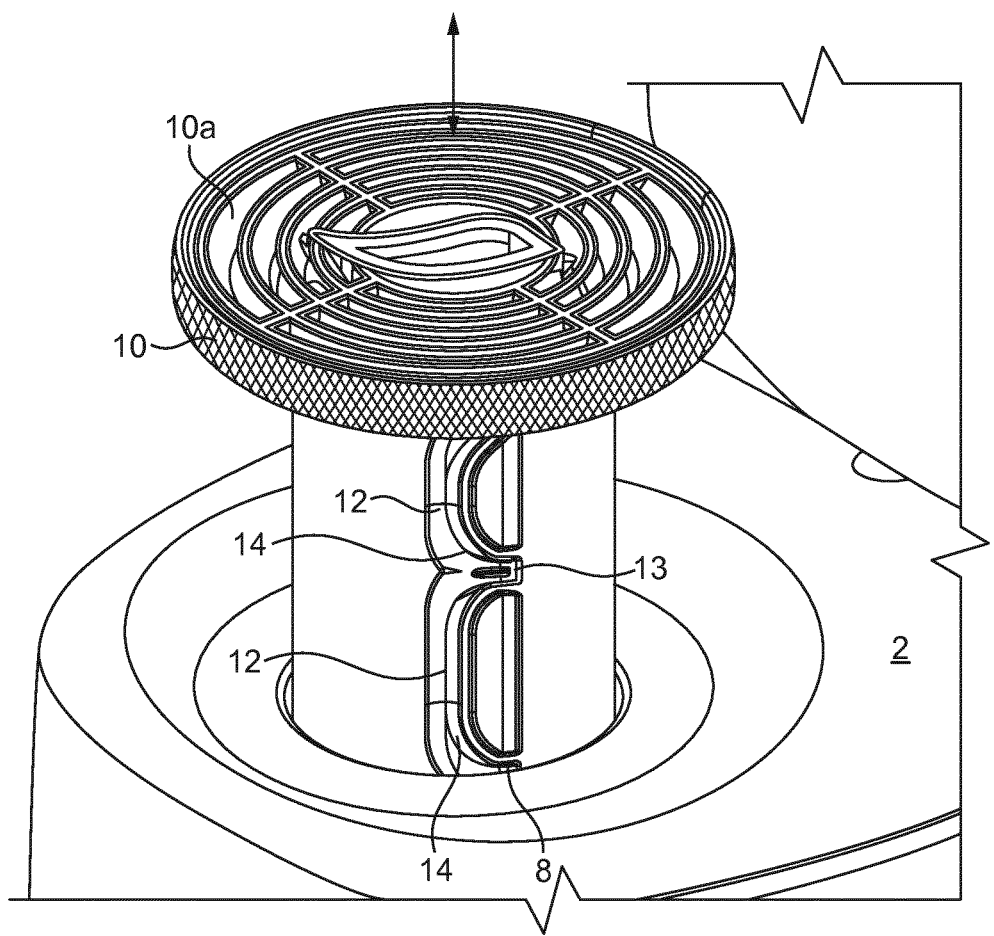

First, from one given position of the cup tray, the user rotates manually the cup tray around its vertical axis to unlatch the guiding pins 8 from the latch grooves 15 of the horizontal cam branches 13, hence unlocking the cup tray from its height position. In the example shown in FIG. 8A, the cup tray is positioned initially in its lowermost position. Then, the user lifts the cup tray by pulling the external edges of the plate 10, in order to adjust the new height position of the cup tray in the intermediate position (FIG. 8B) or in the uppermost position (FIG. 8C). In each position, after lifting the cup tray in the desired height position, the user rotates the cup tray to engage the guiding pins 8 into the horizontal cam branches 13, and forces the rotation to overcome the latch force to releasably lock the tray in the desired position. To release the cup tray from a given position, the user rotates said tray in the opposite direction around its longitudinal axis, and then pulls upwardly or pushes downwardly to reach, respectively an upper position or lower position. According to the principle of the invention, all the movements of rotation and translation of the tray from one position to another are greatly facilitated by the cusp-shaped guiding paths described herein before, which act like a smooth cam path to orientate the movement of the tray within the pit. The force required to manipulate the tray is therefore much less than usually necessary with known manual cup trays.

Figure 9:
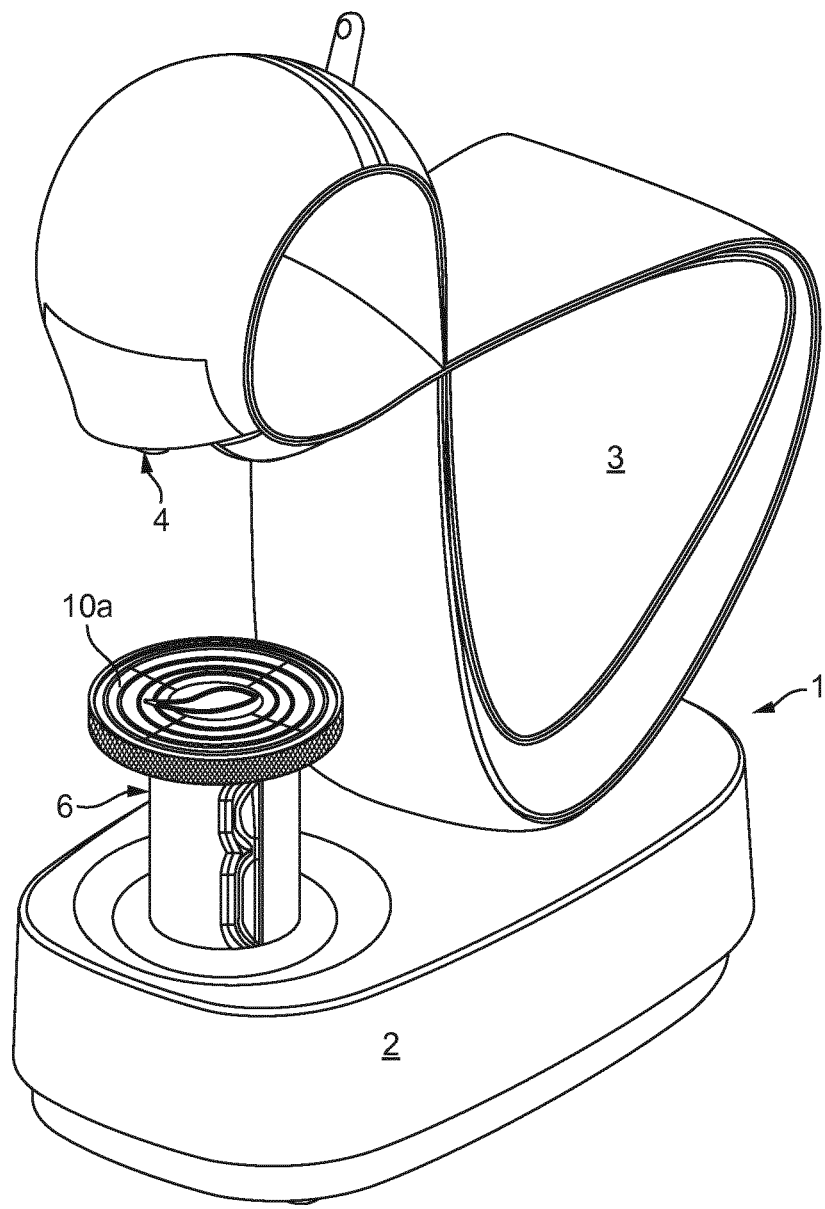
FIG. 9 is a view similar to FIG. 2, with the cup tray in its highermost position.

FIG. 9 illustrates a beverage preparation machine comprising a cup tray according to the invention, in its uppermost position.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food and beverage preparation machine comprising a machine body, a fluid system adapted to mix a fluid with an ingredient for the preparation of a food or beverage product, and a dispensing opening for delivering the food or beverage into a cup or other receptacle, and further comprising a cup tray that can be attached to the machine body in at least two alternative height positions relative to the dispensing opening:

the machine body comprises a pit with a cylindrical opening located below the dispensing opening, the cylindrical opening comprising at least one guiding pin extending inwardly from the pit's opening peripheral edge, and the cup tray comprises a horizontal plate and a cylinder extending vertically downwardly therefrom, the outer surface of the cylinder having at least one vertical cam groove adapted to receive the guiding pin in a slidable manner for displacing the cup tray in height, and at least two discrete superimposed horizontal groove branches extending from the vertical groove, for fixing the cup tray at predetermined height positions.

2. A machine according to claim 1, wherein each horizontal groove branch extends horizontally from the vertical cam groove through lower and upper curved camways defining a cusp-shaped cam path.

3. A machine according to claim 1, wherein the cup tray cylinder is hollow and has one lower end closed, and one upper end opened through the plate, the opening being covered by a removable grid.

4. A machine according to claim 1, which is a beverage preparation machine adapted for use with at least one ingredient container.

5. A machine according to claim 1, wherein the ingredient is the group consisting of: roast and ground coffee, powdered or liquid soluble coffee, powdered or liquid soluble dairy ingredient, soluble tea, leaf tea, soup, syrup, powder, liquid and gel nutritional compositions.

6. A machine according to claim 1, wherein the pit comprises at least one vertical ramp protruding inwardly towards the middle of said pit, adapted to cooperate with at least one corresponding latching pin mounted on a flexible strip of the cylinder, so as to form a latch mechanism for releasably locking the tray in each of its height positions.

7. A machine according to claim 6, wherein the pit comprises three equidistant ramps and the cylinder comprises three corresponding equidistant flexible strips.

* * * * *